(12) United States Patent
Yang

(10) Patent No.: US 11,791,617 B2
(45) Date of Patent: Oct. 17, 2023

(54) CURRENT CUT-OFF DEVICE FOR HIGH-VOLTAGE DIRECT CURRENT WITH CAPACITIVE BUFFER CIRCUIT, AND CONTROL METHOD

(71) Applicant: SUPERGRID INSTITUTE, Villeurbanne (FR)

(72) Inventor: Yang Yang, Villeurbanne (FR)

(73) Assignee: SUPERGRID INSTITUTE, Villeurbanne (FR)

( * ) Notice: Subject to any disclaimer, the term of this patent is extended or adjusted under 35 U.S.C. 154(b) by 75 days.

(21) Appl. No.: 17/418,428

(22) PCT Filed: Dec. 20, 2019

(86) PCT No.: PCT/FR2019/053271
§ 371 (c)(1),
(2) Date: Jun. 25, 2021

(87) PCT Pub. No.: WO2020/136340
PCT Pub. Date: Jul. 2, 2020

(65) Prior Publication Data
US 2022/0029408 A1 Jan. 27, 2022

(30) Foreign Application Priority Data
Dec. 27, 2018 (FR) ..................... 1874216

(51) Int. Cl.
*H02H 9/04* (2006.01)
*H02H 3/20* (2006.01)
*H02H 9/00* (2006.01)

(52) U.S. Cl.
CPC ............ *H02H 3/202* (2013.01); *H02H 9/005* (2013.01); *H02H 9/04* (2013.01)

(58) Field of Classification Search
CPC .......... H02H 3/202; H02H 3/00; H02H 3/243; H02H 9/005; H02H 9/04; H01C 7/12;
(Continued)

(56) References Cited

U.S. PATENT DOCUMENTS 3,758,790 A 9/1973 Kind et al.
3,777,178 A 12/1973 Gratzmuller
(Continued)

FOREIGN PATENT DOCUMENTS

CN 103219699 A 7/2013
CN 103296636 A 9/2013
(Continued)

OTHER PUBLICATIONS

Bonin et al., "A Method of Current Interruption in HVDC Networks by Means of AC Circuit-Breakers with Adapted Arc Characteristics and Energy Absorbers," International Conference on Large High Tension Electric Systems, Aug. 24, 1970-Sep. 2, 1970, pp. 1-15.
(Continued)

*Primary Examiner* — Danny Nguyen
(74) *Attorney, Agent, or Firm* — WORKMAN NYDEGGER

(57) ABSTRACT

A high-voltage direct current cut-off device, includes: a primary mechanical switch and a secondary mechanical switch placed successively between a primary point and a secondary point but either side of an intermediate point, a primary surge arrester arranged parallel with the primary switch, a secondary surge arrester arranged electrically parallel with the secondary switch. The secondary surge arrester is arranged electrically between the intermediate point and the secondary point, and in that the device comprises a capacitive buffer circuit electrically in parallel with the assembly formed by the primary switch and the secondary switch, and electrically in parallel with the assem-
(Continued)

bly formed by the primary surge arrester and the secondary surge arrester, wherein the capacitive buffer circuit comprises an activation switch and a buffer capacitance.

22 Claims, 3 Drawing Sheets

(58) Field of Classification Search
CPC .... H01C 8/04; H01H 9/541; H01H 2009/543; H01H 2009/546; H01H 2009/544; H01H 33/596
USPC ...................................................... 361/2–13
See application file for complete search history.

(56) References Cited

U.S. PATENT DOCUMENTS

| | | | |
|---|---|---|---|
| 4,305,107 A * | 12/1981 | Murano | H02H 7/222 361/4 |
| 4,442,469 A | 4/1984 | Yanabu et al. | |
| 4,488,021 A | 12/1984 | Yoshizumi | |
| 4,578,730 A | 3/1986 | Tokuyama et al. | |
| 4,618,905 A | 10/1986 | Tokuyama et al. | |
| 5,121,281 A | 6/1992 | Pham et al. | |
| 5,225,642 A | 7/1993 | Yamamoto et al. | |
| 5,235,147 A | 8/1993 | Pham et al. | |
| 5,266,758 A | 11/1993 | Pham et al. | |
| 5,452,170 A * | 9/1995 | Ohde | H01H 33/596 361/13 |
| 5,517,578 A | 5/1996 | Altman et al. | |
| 5,629,658 A | 5/1997 | Chen | |
| 5,828,176 A | 10/1998 | Goebel | |
| 8,683,330 B2 | 3/2014 | Katoh | |
| 8,837,093 B2 * | 9/2014 | Panousis | H01H 33/75 361/13 |
| 9,640,973 B2 | 5/2017 | Rong et al. | |
| 9,875,861 B2 | 1/2018 | Ergin et al. | |
| 10,256,067 B1 | 4/2019 | Sommerer et al. | |
| 10,468,873 B2 | 11/2019 | Luscan et al. | |
| 10,475,600 B2 | 11/2019 | Berard et al. | |
| 2012/0327460 A1 | 12/2012 | Katoh | |
| 2013/0070492 A1 | 3/2013 | Skarby | |
| 2014/0005053 A1 | 1/2014 | Schacherer et al. | |
| 2014/0217833 A1 | 8/2014 | Rong et al. | |
| 2014/0299579 A1 | 10/2014 | Hartmann et al. | |
| 2014/0313628 A1 | 10/2014 | Hafner et al. | |
| 2015/0002977 A1 | 1/2015 | Dupraz | |
| 2016/0285250 A1 | 9/2016 | Lee et al. | |
| 2016/0300671 A1 | 10/2016 | Ergin et al. | |
| 2017/0178832 A1 | 6/2017 | Berard et al. | |
| 2017/0178844 A1 | 6/2017 | Ängquist et al. | |
| 2017/0271100 A1 | 9/2017 | Ka et al. | |
| 2017/0365998 A1 | 12/2017 | Luscan et al. | |
| 2018/0019583 A1 * | 1/2018 | Dupraz | H02H 1/04 |
| 2018/0233309 A1 | 8/2018 | Gery et al. | |
| 2019/0295801 A1 | 9/2019 | Sommerer et al. | |
| 2019/0355534 A1 | 11/2019 | Gery et al. | |
| 2020/0006933 A1 | 1/2020 | Legendre et al. | |

FOREIGN PATENT DOCUMENTS

| | | |
|---|---|---|
| CN | 103346541 A | 10/2013 |
| CN | 103403830 A | 11/2013 |
| CN | 103618298 A | 3/2014 |
| CN | 103779828 A | 5/2014 |
| DE | 2136865 B1 | 12/1972 |
| DE | 102011083514 A1 | 3/2013 |
| EP | 0384346 A1 | 8/1990 |
| EP | 0431510 A1 | 6/1991 |
| EP | 0660352 A1 | 6/1995 |
| EP | 2978005 A1 | 1/2016 |
| EP | 3059827 A1 | 8/2016 |
| EP | 3089301 A1 | 11/2016 |
| EP | 3091626 A1 | 11/2016 |
| EP | 3306635 A1 | 4/2018 |
| EP | 3321948 A1 | 5/2018 |
| EP | 3522194 A1 | 8/2019 |
| EP | 3522196 A1 | 8/2019 |
| FR | 2154929 A5 | 5/1973 |
| FR | 2668648 A1 | 4/1992 |
| FR | 2674984 A1 | 10/1992 |
| JP | S4874320 A | 10/1973 |
| JP | S61161018 A | 7/1986 |
| JP | H02191042 A | 7/1990 |
| JP | 2013004010 A | 1/2013 |
| WO | 2011057675 A1 | 5/2011 |
| WO | 2012100831 A1 | 8/2012 |
| WO | 2014166528 A1 | 10/2014 |
| WO | 2015078525 A1 | 6/2015 |
| WO | 2015103857 A1 | 7/2015 |
| WO | 2015166600 A1 | 11/2015 |
| WO | 2015185096 A1 | 12/2015 |
| WO | 2016092182 A1 | 6/2016 |
| WO | 2017103355 A1 | 6/2017 |
| WO | 2017116296 A1 | 7/2017 |
| WO | 2018162421 A1 | 9/2018 |
| WO | 2019077269 A1 | 4/2019 |
| WO | 2020136350 A1 | 7/2020 |
| WO | 2020147572 A1 | 7/2020 |

OTHER PUBLICATIONS

Tokuyama et al., "Development and Interrupting Tests on 250KV 8KA Hvdc Circuit Breaker," IEEE Transactions on Power Apparatus and Systems, vol. PAS-104, No. 9, Sep. 30, 1985, 8 Pages.
Hinrichsen, "Metal-Oxide Surge Arresters in High-Voltage Power Systems: Fundamentals," Siemens, 3rd Edition, at least by Dec. 31, 2012, 128 Pages.
Tahata et al., "HVDC Circuit Breakers for HVDC Grid Applications," AORC Technical Meeting, at least by Dec. 31, 2014, 9 Pages.
Xiang et al., "DC Circuit Breaker Using Superconductor for Current Limiting," IEEE Transactions on Applied Superconductivity, vol. 25, No. 2, Apr. 31, 2015, 7 Pages.
"The Surge Protection Device," Schneider Electric, at least by Dec. 31, 2015, 14 Pages.
Negari, "A New Design of Solid State Circuit Breaker for HVDC Applications," Ryerson University, at least by Dec. 31, 2015, 101 Pages.
K, "Sequential Auto-Reclosing Method for Hybrid HVDC Breaker in VSC HVDC Links," IEEE, at least by Dec. 31, 2016, 6 Pages.
Zhang et al., "A Novel Low Voltage Hybrid DC Switch Using Resonant Current Injection," International Conference on Components and Systems for DC Grids, Mar. 14-15, 2017, pp. 1-6.
Ebner et al., "Fault Arc Extinction and System Re-Start on HVDC Transmission Lines Using LLC or VSC Full-Bridge Converters with Integrated Arc Recovery Simulation Models," Siemens AG, May 29, 2017, 5 Pages.
Shu et al., "A Soft Reclosing Model for Hybrid DC Circuit Breaker in VSC-MTDC System," IEEE, Feb. 7, 2019, 5 Pages.
Pathmanathan et al., "Self-Power Supply and Control System for Hybrid Semiconductor DC Switch," European Conference on Power Electronics and Applications, Dec. 10-13, 2018, 10 Pages.
"High Voltage Surge Arresters: Buyer's Guide," ABB AB, Edition 14, May 31, 2018, 128 Pages.
Zhang et al., "Fault Property Identification Method and Application for MTDC Grids with Hybrid DC Circuit Breaker," Electrical Power and Energy Systems, vol. 110, Mar. 8, 2019, pp. 136-143.
Yang et al., "An Adaptive Reclosing Strategy for MMC-HVDC Systems with Hybrid DC Circuit Breakers," IEEE, Aug. 19, 2019, pp. 1-11.
Search Report from corresponding French Application No. FR1874216, dated Sep. 16, 2019.
International Search Report and Written Opinion from PCT Application No. PCT/FR2019/053271, dated Mar. 17, 2020.

* cited by examiner

[Fig. 1]
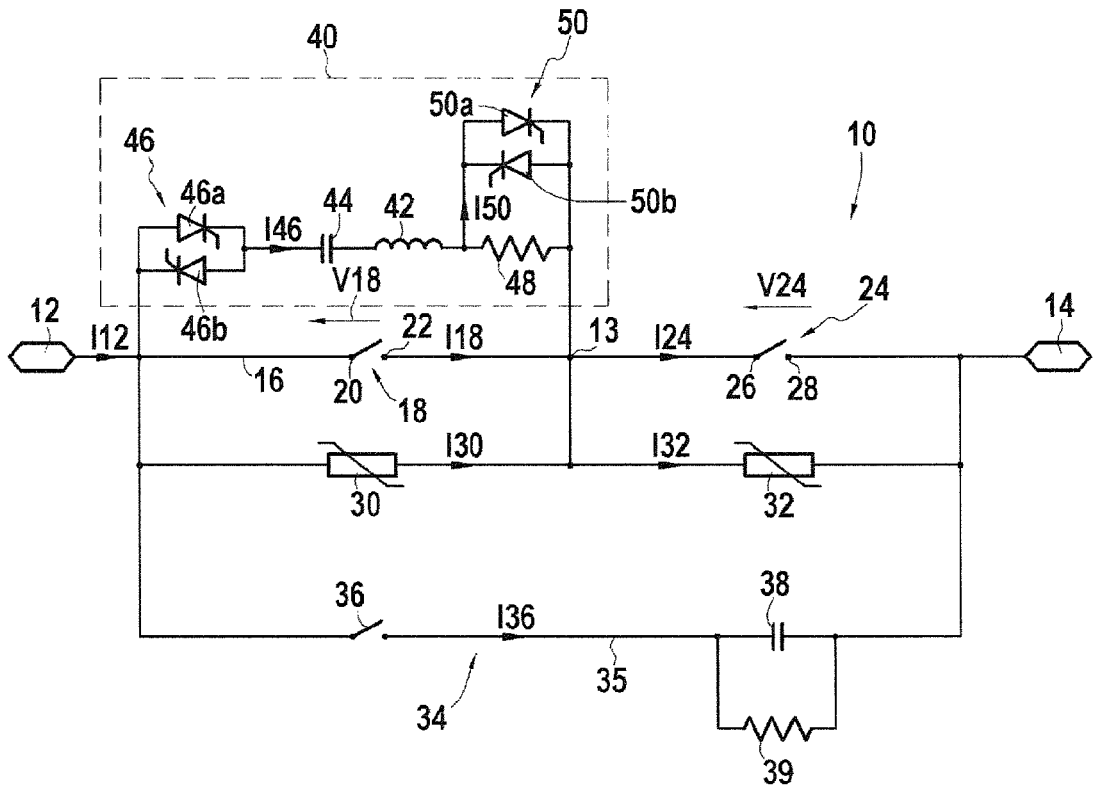
[Fig. 2]
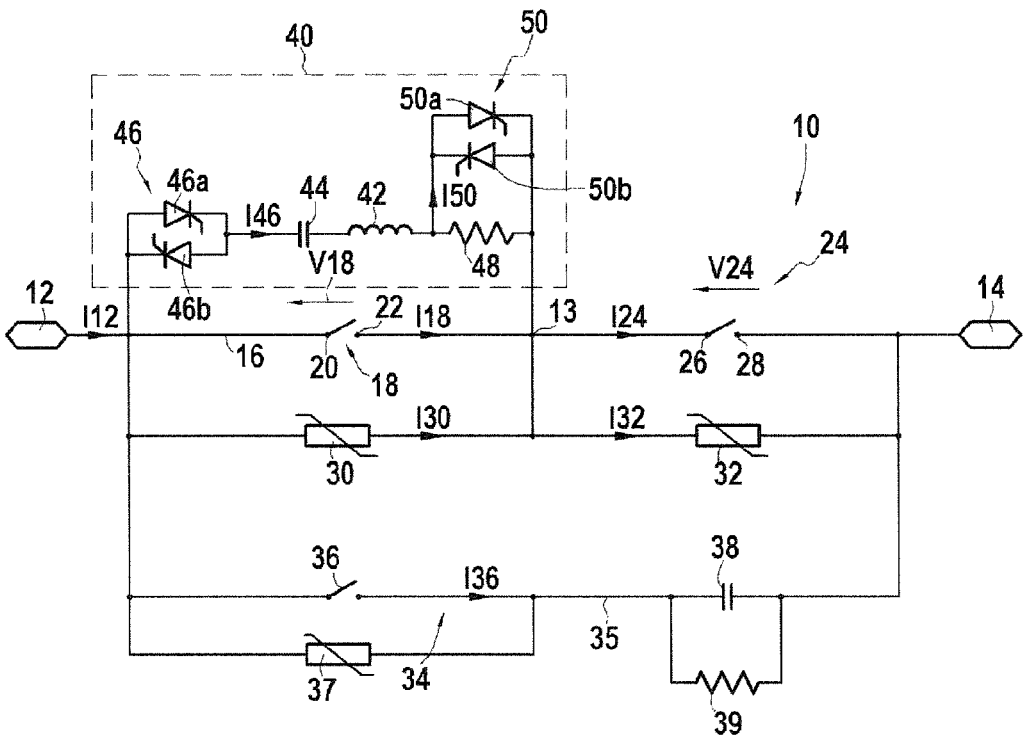

[Fig. 3]
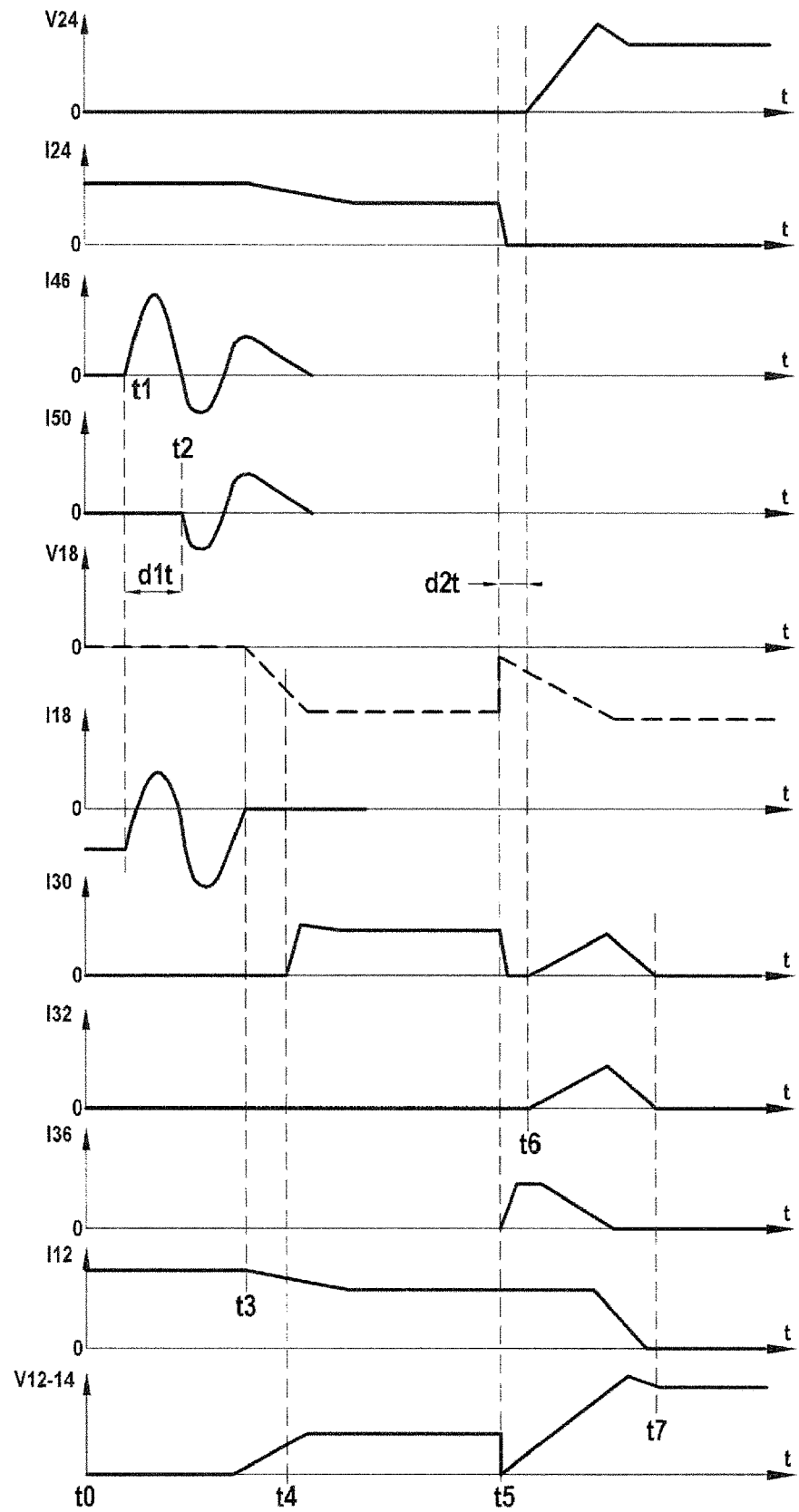

[Fig. 4]
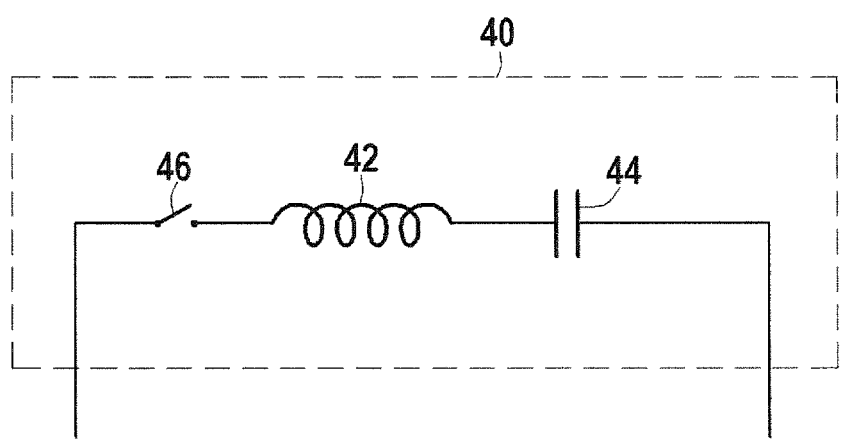

CURRENT CUT-OFF DEVICE FOR HIGH-VOLTAGE DIRECT CURRENT WITH CAPACITIVE BUFFER CIRCUIT, AND CONTROL METHOD

TECHNICAL FIELD

The invention relates to the field of high-voltage DC electrical current transmission and/or distribution networks, generally referred to as HVDC networks. The invention particularly relates to fault current cut-off devices intended for such networks.

HVDC networks are in particular envisaged as a solution to the interconnection of disparate or non-synchronous electricity production sites. HVDC networks are in particular envisaged for the transmission and the distribution of energy produced by offshore wind farms rather than alternating current technologies, due to lower line losses and to the absence of impact of the parasitic capacitances of the network on long distances. Such networks typically have voltage levels on the order of 100 kV and more.

In the present text, a device in which the nominal operating voltage is greater than 1,500 V in direct current is considered as a high voltage, for a direct current. Such a high voltage is, in a complementary manner, also qualified as a very high voltage when it is greater than 75,000 V (75 kV) in direct current. Of course, the high voltage field includes the very high voltage field.

The cut-off of the direct current in such networks is a crucial issue directly conditioning the feasibility and development of such networks.

There are known cut-off apparatuses of the mechanical circuit breaker type to achieve the cut-off of the alternating current, that is to say the cut-off of the current is obtained only by the opening of a mechanical switch element. Such a mechanical switch element includes two contact-making conductive parts which are in mechanical and electrical contact when the switch element is closed and which separate mechanically when the switch element is open. These mechanical circuit breakers have several drawbacks when they are crossed by high currents.

In the presence of a significant current and/or voltage, the mechanical separation can result in the establishment of an electric arc between the two conductive parts, because of the significant energies accumulated in the network that the apparatus protects. As long as the electric arc remains established through the mechanical separation, the cut-off apparatus does not achieve the electrical cut-off since a current continues to flow through the apparatus by the presence of the arc. The electrical cut-off, in the sense of the effective interruption of the flow of the electrical current, is sometimes particularly difficult to achieve in a direct current and high voltage context, these conditions tending to maintain the electric arc. Furthermore, this electric arc degrades, on the one hand by erosion, the two contact-making conductive parts, and on the other hand the surrounding environment by ionization. In addition, the current takes some time to stop because of this ionization. This requires maintenance operations on the cut-off apparatus which are burdensome and expensive.

The fault currents in a HVDC network are particularly violent and destructive. When a fault generating a high current occurs, it is necessary to quickly cut it off or possibly to limit it while waiting for the cut-off to be possible. In addition, the cut-off of the HVDC currents is more complex to achieve than that of the alternating currents (AC). Indeed, when cut-off of an alternating current, advantage is taken of a zero crossing of the current to achieve the cut-off, which is not the case with a direct current, in particular HVDC.

PRIOR ART

Various solutions have been proposed to facilitate the current cut-off in an HVDC line. For example, documents DE-10.2011.083514, WO-2015/078525, WO-2015/166600, US-2017/0178844, or DE-2136865 can be cited.

Some solutions use many active semiconductor switching components, mainly thyristors and IGBTs. However, these components have a high price/power ratio. Excessive use of such semiconductor switches increases the cost of the solution.

Document WO-2015/185096 describes a current cut-off device for high-voltage DC current. This device comprises a mechanical primary switch and a mechanical secondary switch interposed successively in the main line between the primary point and the secondary point but on either side of an intermediate point of the main line, the two mechanical switches being each controlled between an open state and a closed state. The device comprises a primary surge protector arranged in parallel with the primary switch between the primary point and the intermediate point. It further comprises a secondary surge protector arranged electrically in parallel with the assembly formed by the primary switch and the secondary switch. This device furthermore includes a primary capacitor in parallel with the primary switch, a secondary capacitor in parallel with the secondary switch, and a tertiary capacitor arranged electrically in parallel with the assembly formed by the primary switch and the secondary switch. These capacitors have the role of balancing the voltages across the surge protectors and, consequently, across the two switches. This device furthermore includes an LC-type oscillation circuit arranged electrically in parallel with the assembly formed by the primary switch and the secondary switch. This oscillation circuit is able to generate a counter-current in the main line so as to create a zero crossing of the current in the main line, therefore through two switches. It is however noted that the calibration of the oscillation current is complex because it must ensure a zero crossing under conditions that must simultaneously allow the extinction of the arc in the two switches. If this is possible for predetermined values of fault current intensity, it becomes very complex to obtain the desired result for disparate values of fault current intensity.

The device illustrated in FIG. 9 of document U.S. Pat. No. 4,442,469 includes three switches in series in the main line. By opening the three (41a, 41b and 42), an arc is created between the contacts of each switch. The switch 42 first interrupts the current using the capacitor 5 and the negative impedance characteristic of the arc. By then triggering the discharge interval 8, a counter-current and a zero crossing are created in the switch(es) 41a and 41b to complete the current interruption in these switches 41a and 41b. A resistor 14 and a capacitor 15 are used to balance the voltage between two switches 41a and 41b. Since this solution is based on the voltage of the switch arc to create a zero crossing of the current in the first switch 42, it is very difficult to interrupt a high fault current. The current interruption with this technique is limited to currents below 8 kA.

In the device of document U.S. Pat. No. 3,758,790, it is provided to open a switch S1 in order to create an arc between its contacts, then to close a switch HS in order to switch the current on an oscillation LC1 circuit so as to generate a zero crossing of the current in S1 to complete the opening of S1. The current switches on the resistor R1 and decreases. S2 is then opened and the spark gap FS is activated to switch the residual current on the branch C2R2. This then creates a zero crossing of the current in S2 and the switch S2 completes the current interruption. With this solution, it is difficult to interrupt a high-intensity current. In addition, this solution requires that the main switches S1 and S2 both have a holding voltage greater than the voltage of the network. In addition, no surge limitation is provided in this design.

Documents WO-2015/103857, EP-3.091.626, CN-103.296.636 and WO-2012/100831 all describe oscillation circuits which combine, in series, a capacitance and a dedicated inductive component, the circuit being intended to create an oscillatory current to impose a zero crossing of the current in the switch. As indicated above, these circuits imperatively require, in the initial state, that is to say before their activation, that the capacitance is pre-charged. Indeed, it is the charge of this capacitance that is used to create the oscillating current able to oppose the current flowing through the switch. Likewise, in these circuits, the presence of a dedicated inductive component is necessary to create the oscillation of the current and to limit the rate of variation of the current in the oscillation circuit.

In summary, according to the prior art, there is no solution having a current interrupting capability greater than 10 kiloamperes (kA) with reasonable size and cost. The invention aims to propose solutions which have a current interrupting capability that can cut off currents on the order of several tens of kiloamperes, for example 20 kiloamperes, with reasonable size and cost.

DISCLOSURE OF THE INVENTION

The invention therefore proposes a current cut-off device for high-voltage DC electrical current, of the type including:
  a main line between a primary point and a secondary point,
  a mechanical primary switch and a mechanical secondary switch interposed successively in the main line between the primary point and the secondary point but on either side of an intermediate point of the main line, the two mechanical switches being each controlled between an open state and a closed state,
  a primary surge protector arranged in parallel with the primary switch between the primary point and the intermediate point,
  a secondary surge protector arranged electrically in parallel with the secondary switch.

The device is characterized in that the secondary surge protector is arranged electrically between the intermediate point and the secondary point, and in that the device includes, between the primary point and the secondary point, a capacitive buffer circuit, electrically in parallel with the assembly formed by the primary switch and the secondary switch, and electrically in parallel with the assembly formed by the primary surge protector and the secondary surge protector, the capacitive buffer circuit including an activation switch and a buffer capacitance.

A device according to the invention may comprise other optional characteristics of the invention, taken alone or in combination.

The capacitive buffer circuit preferably does not include a dedicated inductive component.

The activation switch and the buffer capacitance may be arranged electrically in series in a line of the capacitive buffer circuit going from the primary point to the secondary point.

The capacitive buffer circuit may include a circuit for discharging the buffer capacitance.

The capacitive buffer circuit may include a tertiary surge protector arranged in parallel with the activation switch, for example directly across the activation switch.

The device may include an oscillation circuit arranged electrically in parallel with the primary switch between the primary point and the intermediate point, the oscillation circuit being able to generate a zero crossing of the current through the primary switch.

The oscillation circuit may include at least an inductance, a capacitance and an oscillation trigger electrically in series with each other into the oscillation circuit.

The device may include, in the oscillation circuit, at least one damping resistor electrically in series with the inductance, the capacitance and the oscillation trigger of the oscillation circuit, and a controllable device for varying the resistance value inserted in series into the oscillation circuit.

The device may include at least one bypass switch of the damping resistor, the bypass switch being able to switch between an open state and a closed state, the damping resistor and the bypass switch being arranged such that, in a state of the bypass switch, the damping resistor is inserted electrically in series into the oscillation circuit with the inductance, the capacitance and the oscillation trigger of the oscillation circuit while, in the other state of the bypass switch, the damping resistor is short-circuited relative to the oscillation circuit.

The oscillation circuit may include at least one permanent resistor, permanently inserted into the oscillation circuit, electrically in series with the inductance, the capacitance and the oscillation trigger of the oscillation circuit.

The oscillation circuit may include several damping resistors each associated with a distinct bypass switch of the damping resistor, each bypass switch being able to switch between an open state and a closed state, a damping resistor and the associated bypass switch being arranged such that, in a state of the bypass switch, the damping resistor associated with the switch is inserted electrically in series into the oscillation circuit with the inductance, the capacitance and the oscillation trigger of the oscillation circuit while, in the other state of the bypass switch, the damping resistor associated with the switch is short-circuited relative to the oscillation circuit.

The primary switch may be or include at least one vacuum switch.

The secondary switch may be or include at least one insulating gas switch. Alternatively, the secondary switch can be or include at least one vacuum switch.

In one embodiment, the device is characterized in that the secondary surge protector is arranged electrically between the intermediate point and the secondary point, and in that the device includes, between the primary point and the secondary point, a capacitive buffer circuit, electrically in parallel with the assembly formed by the primary switch and the secondary switch, and electrically in parallel with the assembly formed by the primary surge protector and the secondary surge protector, the capacitive buffer circuit including an activation switch, a buffer capacitance and a circuit for discharging the buffer capacitance, and the capacitive buffer circuit does not include a dedicated inductive component.

The invention also relates to a method for controlling a cut-off device as described above, characterized in that it includes the steps of:
  mechanically opening the primary switch and the secondary switch;

cutting off the current in the open primary switch to cause the occurrence, across the primary switch, of a voltage greater than the transition voltage of the primary surge protector suitable for switching it into a current conduction mode;

switching the activation switch to allow, in the capacitive buffer circuit, the passage of a current suitable for charging the buffer capacitance and diverting the current in the secondary switch.

This method may include the steps of:

mechanically closing the main switch;

determining one or more parameters of the current through the device or the phase-to-ground voltage and, based on the parameters of the current through the device or on the phase-to-ground voltage, causing immediate reopening of the device;

mechanically closing the secondary switch if there has not been any immediate reopening of the device.

Such a method may further include determining a value of intensity of a current to be cut off through the device, and determining, based on the determined value of fault current intensity, the state into which the at least one bypass switch must be switched.

In some methods according to the invention, some at least of the bypass switches of the oscillation circuit can be switched with a time shift relative to each other.

In some methods according to the invention, in the initial state when the activation switch is switched to allow, in the capacitive buffer circuit, the passage of a current suitable for charging the buffer capacitance, the buffer capacitance is discharged.

BRIEF DESCRIPTION OF THE DRAWINGS

FIG. 1 is a schematic view of a first embodiment of a cut-off device according to the invention.

FIG. 2 is a schematic view of a second embodiment of a cut-off device according to the invention FIG. 3 is a graph schematically illustrating the variations of some of the quantities characteristic of the operation of a device according to the first embodiment of the invention, during an opening process.

FIG. 4 is a schematic view of one variant of an oscillation circuit able to be implemented in a cut-off device according to the invention.

DESCRIPTION OF THE EMBODIMENTS

FIG. 1 is a schematic representation of a first embodiment of a cut-off apparatus 10 according to the invention, for high-voltage, even very high-voltage, DC current.

As can be seen in FIG. 1, the current cut-off device 10 includes a primary point, which may be a first terminal 12, and a secondary point, which may be a second terminal 14. This primary point 12 and this secondary point 14, or terminals, form inputs/outputs for the current in the device 10. Each of these points may correspond to a physical terminal of the device 10, for example a physical connection terminal, or a virtual terminal of the device 10 as being a point along a conductor.

The device 10 includes a main line 16 which extends between the first terminal 12 and the second terminal 14 and in which are interposed, successively in the main line between the primary point 12 and the secondary point 14, a primary switch 18, having a first terminal 20 and a second terminal 22, and a secondary switch 24, also having a first terminal 26 and a second terminal 28. The first terminal 20 of the primary switch 18 is at the same electric potential as the primary point 12. The second terminal 28 of the secondary switch 24 is at the same electric potential as the secondary point 14. The second terminal 22 of the primary switch 18 and the first terminal 28 of the secondary switch 24 are at the same electric potential, and at the same electric potential as an intermediate point 13 of the main line 16 which is arranged between the two switches 18, 24. When the primary switch 18 and the secondary switch 24 are in a closed state, letting through the electrical current, the latter flows through the device 10 in the main line 16, which is then the line of lowest impedance of the device 10 between the primary point 12 and the secondary point 14. Either of the primary switch 18 and the secondary switch 24, or both, can be switched into an open state or a closed state.

The device 10 is intended to be integrated into an electrical installation. For example, the first terminal 12 of the device 10 can be connected to a portion of the installation which may comprise a high-voltage source, for example greater than 100 kilovolts. The second terminal 14 can for example be connected to a current consuming circuit, for example an electrical charge or an electrical network. In this way, it can be considered that, in the example illustrated, the first terminal 12 is an upstream terminal, or a current input terminal, while the second terminal 14 is a downstream terminal, or a current output terminal, in the direction of flow of the current. Thus, in this example, the main line 16 of the device would be intended to be crossed by the nominal current provided by the DC voltage source. However, the device 10 according to the invention is reversible, so that a flow of the current could be provided through the device in the opposite direction.

The electrical installation is provided to operate at a nominal DC voltage, in the high voltage field, therefore at least greater than 1,500 volts, preferably in the very high voltage field, therefore greater than 75,000 volts. The invention will in particular find an advantageous application for a cut-off device having the ability to cut off a current of up to 3,000 amperes, preferably of up to 10,000 amperes, even up to 20,000 amperes, at a voltage greater than at least 100,000 volts (100 kV).

The primary switch 18 and the secondary switch 24 can be in particular of the circuit breaker, disconnector or fuse type, etc. In the more specific examples described below, the primary switch 18 and the secondary switch 24 are for example each formed by a circuit breaker.

The primary switch 18 and the secondary switch 24 are preferably both mechanical electrical cut-off apparatuses, in which the electrical cut-off is obtained by moving, in particular by spacing apart, two electrical contacts or pairs of electrical contacts. In mechanical apparatuses, the displacement of the electrical contacts is generally achieved by mechanical, pneumatic, hydraulic or electrical maneuvering members or actuators, possibly through motion transfer kinematics. This displacement can be monitored electronically. As indicated above, in the presence of a significant current and/or voltage, the mechanical separation of the electrical contacts can result in the establishment of an electric arc between the two electrical contacts of the switch, due to significant energies accumulated in the network that the apparatus protects. As long as the electric arc remains established through the mechanical separation, the switch does not achieve the electrical cut-off since a current continues to flow through the switch by the presence of the arc. As will be seen below, the invention provides means for ensuring the electrical cut-off, in the sense of the effective interruption of the flow of the electrical current.

The primary switch 18 and/or the secondary switch 24 can each consist of a single mechanical electrical cut-off apparatus, or can each consist of several mechanical electrical cut-off apparatuses arranged electrically in series and/or in parallel. It may be an apparatus called "metal enclosed" apparatus where the current supply means (also called "busbar") are enclosed in a sealed chamber filled with an insulating fluid. The metal enclosed apparatuses can be in particular designed in a more compact way than the apparatuses where the insulation is achieved in the air.

A mechanical electrical cut-off switch may be in the conventional form including in particular two electrodes which are held, by insulating supports, in fixed positions remote from the peripheral wall of a chamber which is at ground potential. These electrodes are electrically connected or electrically separated based on the position of a movable connection member forming part of one of the electrodes, for example a sliding tube actuated by a command. The tube is generally carried by an electrode, to which it is electrically connected, and the separation of the tube from the opposite electrode is able to create an electric arc which may be extended during the opening motion of the switch during which the tube moves away from the opposite electrode. A mechanical electrical cut-off switch conventionally includes two pairs of electrical contacts carried by the tube and the two electrodes. The first pair is the pair through which the nominal current passes in the fully closed position of the apparatus. This contact pair can be assisted by a second pair of contacts, called arcing contact or pair of secondary contacts. The two contacts of this pair are intended to remain in direct contact during the separation of the first pair so as to minimize the arcing phenomenon on the first one and thus guarantee a good electrical conduction state in the fully closed position. Conversely, the contacts of the secondary pair separate last and see the establishment of the electric arc.

In some embodiments of the invention, the secondary switch 24 is an insulating fluid switch, or includes at least one insulating fluid switch, in particular insulating gas switch. This type of switches is particularly adapted to interrupt high-voltage, even very-high voltage, currents. In such an apparatus, the active cut-off members, in particular the electrical contacts, are enclosed in a sealed chamber in which there is an insulating fluid which can be a gas, commonly sulfur hexafluoride (SF6), but liquids or oils can also be used. The insulating fluid can be a pressurized fluid, for example at a pressure greater than or equal to 3 bars absolute. This fluid is chosen for its insulating nature, in particular so as to have a dielectric strength greater than that of dry air at equivalent pressure.

In some embodiments, the primary switch 18 is a vacuum switch, or includes at least one vacuum switch, where the active cut-off members, in particular the electrical contacts, are enclosed in a sealed chamber in which the pressure is lower than atmospheric pressure, in particular less than 100 millibars, in particular less than 10 microbars. Such a switch has the advantage of being able to ensure a complete electrical cut-off even in the case of a current which has a high intensity variation rate, it is for which the value of the derivative of the intensity compared to time (aids) is high.

Thus, in some embodiments, including the embodiment which will be described in more detail below, the primary switch 18 is or includes a vacuum switch and the secondary switch 24 is or includes an insulating fluid switch, in particular an insulating gas switch. However, other combinations are possible, for example a combination in which the device includes a primary switch and a secondary switch of the same technology, in particular both of the vacuum switch type.

As can be seen in FIG. 1, the device 10 includes a primary surge protector 30 arranged in parallel with the primary switch 18 between the primary point 12 and the intermediate point 13, therefore electrically in parallel with the primary switch 18, and a secondary surge protector 32 arranged electrically in parallel with the secondary switch 24, the secondary surge protector 32 being therefore arranged electrically between the intermediate point 13 and the secondary point 14.

Such surge protectors allow limiting the amplitude of the difference of potential across the switch in parallel with which they are arranged. A surge protector 30, 32, or "voltage surge arester", is therefore a device that limits the voltage peaks thereacross. The surge protector 30, 32 generally comprises an electrical component which has a variable resistance based on the electrical voltage thereacross. The variation of the resistance value is generally not linear with the electrical voltage across the surge protector 30, 32. Generally, below a transition voltage across the surge protector 30, 32, the resistance thereof is significant, with zero or relatively small decrease in its resistance based on the voltage increase, and the surge protector lets through only a leakage current, preferably less than 1 ampere (A), or even less than 100 milliamps (mA). On the contrary, above the transition voltage across the surge protector, the resistance of the latter decreases rapidly based on the voltage increase, which reaches a clip voltage value, or protection voltage, for which the resistance of the surge protector becomes low, even very low. In other words, the surge protector acts as a voltage limiter thereacross over the current interval for which it was chosen. It opposes the protection voltage when passing the highest current for which the surge protector has been dimensioned. Below the transition voltage, it tends to prevent the passage of the current. Beyond the transition voltage, it authorizes the passage of the current through the surge protector for a small increase of the voltage thereacross. As known, the transition voltage is generally not an accurate value but rather corresponds to a range of transition voltage. However, in the present text, as a definition, the transition voltage of a surge protector is the voltage for which the surge protector lets through a current of 1 ampere (A). The protection voltage is the voltage across the surge protector when it is crossed by the largest current for which it has been dimensioned. Among the surge protectors, lightning arresters are in particular known, which may in particular comprise varistors and TVS diodes (Transient Voltage Suppressor diodes, such as "Transil™" diodes. In particular, within the scope of the invention, the primary surge protector 30 and/or the secondary surge protector 32 may each comprise a metal oxyde varistor (or MOV).

Advantageously, as in the illustrated example, it can be provided that the primary surge protector 30 is a surge protector whose transition voltage is for example comprised in the range from 10,000 volts (10 kV) to 100,000 volts (100 kV). The secondary surge protector 32 will be generally a surge protector whose transition voltage is greater than that of the primary surge protector 30. More specifically, the surge protector has preferably a transition voltage such that the transition voltage ratio between the secondary 32 and primary 30 surge protectors is between 1 and 10.

The transition voltage of the primary surge protector 30 is preferably strictly lower than the nominal voltage of the electrical installation into which the cut-off device 10 is inserted. In particularly optimized embodiments, the primary surge protector 30 and the secondary surge protector 32 will be chosen such that the sum of the transition voltage of the primary surge protector 30 with the transition voltage of the secondary surge protector 32 is greater than or equal to the nominal voltage of the electrical installation.

Thus, by choosing a primary surge protector 30 whose protection voltage is a voltage less than 200 kV, it is ensured that the voltage across the primary switch 18 remains lower than or equal to this protection voltage, which allows using a switch whose cost and space requirement are much lower than the equivalent high-voltage systems. The electrical cut-off at this primary switch 18 is also facilitated.

The primary surge protector 30 and/or the secondary surge protector 32 can each be made in the form of an assembly of several discrete components arranged electrically in series and/or in parallel. Each discrete component is, for example, a lightning arrester, in particular a varistor, such as a metal oxide varistor, or a TVS diode. Preferably, the assembly of several discrete components arranged electrically in series and/or in parallel has, from the point of view of the remainder of the device, the behavior of a single surge protector having an equivalent transition voltage for the assembly and a protection voltage for the assembly.

As can be seen in FIGS. 1 and 2, the cut-off device according to the invention 10 includes, between the primary point 12 and the secondary point 14, a capacitive buffer circuit 34, without a dedicated inductive component, electrically in parallel with the assembly formed by the primary switch 18 and the secondary switch 24, and electrically in parallel with the assembly formed by the primary surge protector 30 and the secondary surge protector 32. This capacitive buffer circuit 34 includes an activation switch 36 and a buffer capacitance 38. In the example illustrated, this circuit therefore comprises an electrical line 35, one end of which is electrically connected to the main line 16 at a point which is at the same electric potential as the primary point 12 and as the first terminal 20 of the primary switch 18, and the other end of which is electrically connected to the main line 16 at a point which is at the same electric potential as the secondary point 14 and as the second terminal 28 of the secondary switch 24. It is in this line 35 that are interposed, electrically in series, the activation switch 36 and the buffer capacitance 38. The buffer capacitance 38 may for example comprise or be formed of one or more capacitors having a total electrical capacitance C38.

The capacitive buffer circuit 34 can have, like any circuit, a parasitic inductance, resulting in particular from the very nature of the electrical components it comprises, and resulting from the geometry of the circuit. However, within the meaning of the invention, this capacitive buffer circuit 34 does not include any dedicated inductive component, that is to say any discrete component having a desired inductive function, therefore any component having an inductance greater than a parasitic inductance, in particular any coil or any inductive ferromagnetic core. The capacitive buffer circuit thus has a very low inductance, for example less than 50 microhenrys or less than 1 microhenry per section of 10 kilovolts of nominal network voltage.

In some embodiments, such as those illustrated in FIGS. 1 and 2, the capacitive buffer circuit 34 includes a circuit for discharging the buffer capacitance 38. In the examples of FIGS. 1 and 2, the discharge circuit is a passive discharge circuit, not including any active component. In this example, the discharge circuit includes a resistor 39 which is arranged in parallel with the buffer capacitance 38. Preferably, the resistor 39 has a high electrical resistance value R39 such that the dipole which consists of the buffer capacitance 38 and of the resistor 39 arranged in parallel, and which is inserted into the electrical line 35, has a significant time constant compared to an electrical cut-off time in the secondary switch 24, for example a time constant greater than 50 milliseconds, preferably greater than 100 milliseconds. In this example, the time constant is equal to the product R39×C38. Another type of discharge circuit, not illustrated in the drawings, may include at least one active component, such as a controlled switch. Thus, a discharge circuit could comprise a controlled switch which would be arranged directly in series electrically with the resistor 39, the assembly of these two components being in parallel with the buffer capacitance 38. When the controlled switch would be switched to a closed state letting through the current, a discharge circuit would be formed between the two plates of the buffer capacitor 38.

The embodiments illustrated in FIGS. 1 and 2 differ from each other only by the presence, in the capacitive buffer circuit 34 of the cut-off device 10 of FIG. 2, of a tertiary surge protector 37 arranged in parallel with the activation switch 36. This tertiary surge protector 37 can be advantageously, as illustrated, arranged directly and only across the activation switch 36, in the sense that it is on the contrary arranged, in the line 35 of the capacitive buffer circuit 34, electrically in series with the buffer capacitance 38. The tertiary surge protector 37 can be advantageously dimensioned to limit the voltage across the activation switch 36. For example, it is possible to choose a surge protector whose protection voltage is in the range from 10,000 volts (10 kV) to 200,000 volts (200 kV). Thus, by choosing a tertiary surge protector 37 whose protection voltage is in this voltage range, it is ensured that the voltage across the activation switch 36 remains in this voltage range, which allows using a switch whose cost and space requirement are much lower than the equivalent systems at higher voltage.

However, in the event of presence of such a tertiary surge protector 37 in the capacitive buffer circuit 40, attention will be given preferably to choosing a tertiary surge protector whose transition voltage is greater than the protection voltage of the primary surge protector 30. This will in particular prevent current from passing through the tertiary surge protector 37 before the closure of the activation switch 36, and therefore avoid charging the buffer capacitance 38 before the closure of the activation switch 36.

The role and the advantage of the presence of such a buffer circuit 34 will appear in particular from the description of the operation of a device provided therewith. Reference will be made for this to FIG. 3, which illustrates the variations of some parameters in the device during a cut-off operation implemented using such a cut-off device 10. However, before describing the role and the advantage of the presence of such a buffer circuit 34, complementary elements for different variants of a cut-off device 10 as a whole are described below. These complementary elements are optional.

In the examples illustrated, the cut-off device 10 advantageously includes an oscillation circuit 40 which is arranged electrically in parallel with the primary switch 18 between the primary point 12 and the intermediate point 13. The oscillation circuit 40 is designed and able to generate a zero crossing of the current through the primary switch 18, and here only through the primary switch 18 and not through the secondary switch 24.

Such an oscillation circuit 40 aims to promote the electrical cut-off through the primary switch 18 when the latter is mechanically open. Indeed, it was seen that even after opening of such a switch, an electric arc may have been established between the separate contacts of the switch, preventing the achievement of an effective electrical cut-off. The zero crossing of the current through the primary switch, generated by the oscillation circuit 40, allows promoting the electrical cut-off through the primary switch 18.

Different embodiments are possible for such an oscillation circuit 40. In particular, it is possible to use an oscillation circuit as described in the prior art mentioned in the preamble of the present application, or derived from this prior art.

In some embodiments, such as those illustrated schematically in FIGS. 1, 2 and 5, the oscillation circuit 40 includes at least an inductance 42, a capacitance 44 and an oscillation trigger 46, arranged electrically in series into the oscillation circuit 40 in parallel with the primary switch 18 between the primary point 12 and the intermediate point 13. FIG. 4 illustrates one embodiment of an oscillation circuit 40 including only an inductance 42, a capacitance 44 and an oscillation trigger 46, arranged electrically in series into the oscillation circuit 40 in parallel with the primary switch 18 between the primary point 12 and the intermediate point 13. For the operation of such an oscillation circuit 40, it may be advantageous that the capacitance is either pre-charged before the triggering of the oscillation circuit 40. In this case, the circuit 40 may include, in addition, a circuit for pre-charging the capacitance 44 (not illustrated in the figures). Moreover, as in the examples of FIGS. 1 and 2, it is advantageously possible to provide, in such an oscillation circuit, at least one damping resistor 48 and at least one bypass switch 50 of the damping resistor. The bypass switch 50 is able to switch between an open state and a closed state. The damping resistor 48 and the bypass switch 50 are arranged such that, in a state of the bypass switch 50, the damping resistor 48 is electrically in series into the oscillation circuit 40 with the inductance 42, the capacitance 44 and the oscillation trigger 46, while, in the other state of the bypass switch 50, the damping resistor 48 is short-circuited relative to the oscillation circuit 40.

It is noted that the damping resistor 48 can be made in the form of an assembly of several discrete components arranged electrically in series and/or in parallel. The associated bypass switch 50 is then generally arranged electrically in parallel with the assembly.

In the examples of FIGS. 1 and 2, the damping resistor 48 is electrically in series with the inductance 42, the capacitance 44 and the oscillation trigger 46, in an electric line of the oscillation circuit 40 which extends from the primary point 12 to the intermediate point 13, here directly and only in parallel with the primary switch 18. The bypass switch 50 is arranged directly and only in parallel with the damping resistor 48. Thus, when the bypass switch 50 is in an open state, the damping resistor 48 is electrically in series into the oscillation circuit 40 with the inductance 42, the capacitance 44 and the oscillation trigger 46 while, when the bypass switch 50 is in a closed state, the damping resistor 48 is short-circuited relative to the oscillation circuit 40.

The oscillation trigger 46 is a switch, advantageously a semiconductor switch, although a mechanical switch can also be envisaged. It is preferably bidirectional. It can thus be, as in the examples of FIGS. 1 and 2, made in the form of an assembly in parallel with two thyristors 46a, 46b mounted head-to-tail. Such an assembly is analogous to a TRIAC. However, other semiconductor components could be used, such as IGBTs or other types of controlled spark gaps. For voltage withstand or current handling reasons, the oscillation trigger 46 can be made in the form of an assembly of switches arranged electrically in series and/or in parallel but which can preferably be controlled so as to behave as a single switch vis-à-vis the remainder of the device.

The bypass switch 50 is advantageously a semiconductor switch, although a mechanical switch can also be envisaged. It is preferably bidirectional. It can thus be, as in the examples of FIGS. 1 and 2, made in the form of a parallel assembly of two thyristors 50a, 50b mounted head-to-tail. Such an assembly is analogous to a TRIAC. However, other semiconductor components could be used, such as IGBTs or other types of controlled spark gaps. For voltage withstand or current handling reasons, the bypass switch 50 can be made in the form of an assembly of switches arranged electrically in series and/or in parallel but can be preferably controlled so as to behave as a single switch vis-à-vis the remainder of the device.

According to non-illustrated variants, the oscillation circuit 40 may include at least one permanent resistor, permanently inserted into the oscillation circuit 40, electrically in series with the inductance 42, the capacitance 44 and the oscillation trigger 46, with the result of determining a minimum value of resistance of the oscillating circuit, when the damping resistor 48 is short-circuited relative to the oscillation circuit 40. The permanent resistor could be made in the form of an assembly of several discrete components arranged electrically in series and/or in parallel.

According to yet another variant of an oscillation circuit 40, the oscillation circuit 40 could include at least a second damping resistor and at least a second bypass switch associated with the second damping resistor, arranged for example in parallel with each other, such that in a state of the second bypass switch, the second damping resistor would be electrically in series into the oscillation circuit 40 with the inductance 42, the capacitance 44 and the oscillation trigger 46, and with the first damping resistor 48 if the latter is inserted into the damping circuit 40. In the other state of the second bypass switch, the second damping resistor would be short-circuited relative to the oscillation circuit 40. Of course, this variant could be generalized to more than two damping resistors, and consequently more than two bypass switches. By having several damping resistors each associated with a bypass switch, it is possible to provide that the bypass switches are controlled simultaneously. On the contrary, it is possible to provide that some at least of the bypass switches of the oscillation circuit are switched with a time shift relative to each other. Thus, it is possible to adapt the total resistance value of the oscillating circuit to more than two resistance value steps.

Note that the two variants mentioned above can be combined in an oscillation circuit including at the same time at least one permanent resistor and several damping resistors, all being inserted in series or able to be inserted in series with each other into the oscillation circuit.

Other embodiments for an oscillation circuit 40 may be provided, implementing for example controlled switches, for example semiconductor switches configured according to an H-bridge, according to a half-point, etc. These switches can each be made in the form of an IGBT (Insulated Gate Bipolar Transistor), thyristors, or other types of transistor.

FIG. 3 illustrates, for a cut-off apparatus according to the invention switching from a closed state allowing the passage of the current through the device, to an open state electrically insulating the primary point 12 from the secondary point 14, the variation over time of the following parameters:

the voltage V24 across the secondary switch 24;
the intensity I24 of the current through the secondary switch 24;

the intensity I46 of the current through the oscillation trigger 46;

the intensity I50 of the current through the bypass switch 50;

the voltage V18 across the primary switch 18;

the intensity I18 of the current through the primary switch 18;

the intensity I30 of the current through the primary surge protector 30;

the intensity I32 of the current through the secondary surge protector 32;

the intensity I12 of the current through the device 10; and the voltage V1214 across the device 10.

In a method for controlling a cut-off device 10 according to the invention, with a view to bringing the device from its closed state to its open state, a step is provided comprising the mechanical opening of the primary switch 18 and of the secondary switch 24. The two switches can be opened mechanically simultaneously, or successively in any order. In the example of FIG. 3, it is assumed that this opening is effective at an instant t0. The step of opening the two switches can be triggered under normal charge, for example with a nominal current provided through the device 10, by a simple desire to open the cut-off device for example with a view to electrically insulating a portion of the electrical installation electrically connected to the primary point 12 of the device 10 relative to another portion of the electrical installation electrically connected to the secondary point 14 of the device 10. The step of opening the two switches can be triggered in the presence of an electrical fault in the electrical installation, for example with a fault current through the cut-off device 10. This fault current may be greater than the maximum nominal current provided through the device 10. Such an opening in the presence of a fault may result from the detection of this fault, in particular from the detection of one or more parameters of the current through the device 10, for example the intensity of the current through the device 10. It is noted that, as described above, it is possible that the mechanical opening of the two switches 18, 24 does not allow, on its own, the electrical opening in the sense of the interruption of the passage of the current through the cut-off device 10, because of the establishment of an electric arc through each of two switches. For the description of the following method, this hypothesis is precisely assumed.

In this hypothesis, the method provides for cutting off the current in the open primary switch 18 to cause the occurrence, across the primary switch, of a voltage greater than the transition voltage of the primary surge protector 30 suitable for switching it into a current conduction mode. To cut off the current in the open primary switch 18, either of the oscillation circuits 40 as described above can be used. However, the current cut-off in the open primary switch 18 can be obtained by other means, in particular by an adapted dimensioning of the primary switch 18, even if this dimensioning leads to a bulkier and/or more expensive primary switch than the one that can be used in case of presence of an oscillation circuit. In the example of FIG. 3, the implementation of the oscillation circuit 40 begins at an instant t1 corresponding to the closure of the oscillation trigger 46, and it is assumed that this electrical opening of the primary switch 18 is effective at the instant t3.

In all cases, this cut-off of the current through the primary switch 18 forces the current through the device 10 to charge the capacitor 44, causing a voltage rise thereacross, which results in the occurrence of this same voltage across the primary surge protector 30, and therefore of the same voltage across the primary switch 18. In the event of a large fault current, this voltage reaches, at an instant t4 in FIG. 3, the transition voltage of the primary surge protector 30, whose resistance then varies to limit the increase of the voltage, which reaches a step. At this stage, it is considered that the surge protector 30 becomes conductive for the current. Thus, it can be considered that, from the instant t4, the current through the device 10 passes through the primary surge protector 30 but continues to flow through the secondary switch 24 due to the presence of an electric arc between the contacts of the latter.

To cause the cut-off of the electric arc in the secondary switch 24, the oscillation trigger current 46 must be canceled and recover its insulation first, then the capacitive buffer circuit 34 is activated by closing the activation switch 36, which corresponds to the instant t5 in FIG. 3. In other words, the activation switch 36 is switched to allow, in the capacitive buffer circuit 34, the passage of a current suitable for charging the buffer capacitance 38 and diverting the current from the secondary switch 24. In the initial state, the buffer capacitance 38 is discharged, for example by the presence of the discharge circuit which is here made by the discharge resistor 39. In other words, the cut-off device 10 is configured so that, in the initial state, that is to say upon switching of the activation switch 36 to allow the passage, in the capacitive buffer circuit 34, of a current suitable for charging the buffer capacitance 38, the buffer capacitance 38 is discharged. Therefore, and due to the presence of a difference of potential across the primary surge protector 30, the current through the device 10 switches to the buffer circuit 34 to charge the buffer capacitance 38. At first, it is considered that, in the example illustrated, the resistance value R39 of the resistor 39 is large enough to neglect the discharge current through the resistor. Conversely, the value of the electrical impedance of the capacitive buffer circuit 34 is much lower than the one taken by the current before t5. This charging time for the buffer capacitance 38, which can be considered to last until the instant t6 in FIG. 3, is particularly important because, during this time, the current through the device 10 is essentially conducted by the buffer circuit 34, in the form of the current I36 through the activation switch 36, which has the consequence of reducing or even canceling the current that flowed through the secondary switch 24, recalling that it is in a mechanical cut-off state, with its contacts separated from each other. This decrease, or even cancellation, of the current I24 through the secondary switch 24 will advantageously cause the extinction of the electric arc in the secondary switch 24. It is noted that the time interval from the instant t5, until the instant t6, during which the current must be diverted from the secondary switch 24 to the buffer circuit 34, which can be called diversion duration d2t, does not need to be very long, it suffices that this time d2t, during which the capacitive buffer circuit 34 conducts the current, is greater than the time necessary for the deionization of the gas present between the separate contacts of the secondary switch 24. Indeed, once the gas is de-ionized, the spacing of the contacts of the secondary switch 24 is sufficient to prevent re-ignition of the arc. This duration d2t is on the order of a few microseconds, preferably less than 20 microseconds.

This diversion duration d2t for which a drop, or even a cancellation, of the current I24 through the secondary switch 24 is observed, can be adjusted to the duration required by a proper dimensioning of the components of the circuit. In general, an increase in the total electrical capacitance C38 of the buffer capacitance 38 will tend to increase this diversion duration d2t.

As a first approximation, it can be considered that the diversion duration d2t is governed by the following law:

$$d2t = Vt30 \times C38 / Idef$$

with:
- d2t the desired diversion duration;
- Vt30 the transition voltage of the primary surge protector 30;
- C38 the total electrical capacitance of the buffer capacitance 38;
- Idef the value of the fault current through the device.

Thus, as an indication, it has been determined that an advantageous value of the total electrical capacitance C38 of the buffer capacitance 38 could be determined by making sure that this value is equal to or greater than the desired diversion duration d2t multiplied by the maximum fault current value Idefmax expected through the device, divided by the transition voltage Vt30 of the primary surge protector 30, namely:

$$C38 = d2t \times Idefmax / Vt30$$

Beyond the instant t6, it is considered that the secondary switch 24 is electrically open and that a voltage can occur thereacross without the risk of reigniting the electric arc. This voltage is reflected across the secondary surge protector 32, which can then play its role of limiting the voltage across the secondary switch. The sum of the voltages across the surge protectors 30 and 32 is the voltage V1214. This sum of voltage can be greater than the nominal voltage of the network as long as there is current passing through the surge protectors, that is to say as long as the current I32 is different from zero. This goes hand in hand with the absorption of energy into the network.

From the instant t7, it is considered that the cut-off device 10 is open, because only a leakage current can flow through the device 10 by passing through the primary surge protector 30 and through the secondary surge protector 32. For that, it is noted that the voltage across the cut-off device 10 is the sum of the voltages across the primary surge protector 30 and across the secondary surge protector 32. This voltage, in steady state when the cut-off device 10 is open, will be generally equal to the nominal voltage of the installation. It is therefore judicious to choose the primary surge protector 30 and the secondary surge protector 32 such that the sum of their transition voltage is greater than or equal to the nominal voltage of the installation.

It will be noted that the cut-off device 10 according to the invention can be associated, in the electrical installation, electrically in series with another cut-off device, for example of the disconnector type, able to completely and reliably interrupt the current in the line. This other cut-off device can be dimensioned to optimize its insulation properties, without having to optimize its current interrupting capability since this function will be primarily ensured by the cut-off device according to the invention.

It should furthermore be noted that the cut-off device according to the invention is a bidirectional device, able to interrupt a current flowing through the device regardless of its direction of flow, therefore in both directions through the device. Therefore, such a cut-off device could be implemented in an installation including a mesh network, in a line in which the direct current can flow, depending on the configuration of the network at a given time, in either direction.

A device according to the invention therefore allows ensuring a rapid and certain electrical opening, to stop the flow of a high intensity fault current (in particular more than 10 kA), at a high voltage, in particular greater than 100 kV. However, once the device is open, it is necessary to be able to electrically re-close the cut-off device 10 in order to allow the restoration of the current if it is believed that the cause of the fault has been overcome. In this case, the device 10 is controlled so as to mechanically close the primary switch 18 and the secondary switch 24, preferably successively and in this order, therefore by mechanically closing the primary switch 18 before the secondary switch 24. Indeed, it is noted that, by respecting this order, the secondary surge protector 32 allows limiting the inrush current when the primary switch 18 is mechanically re-closed.

As soon as the primary switch 18 is closed, it is possible to determine one or more parameters of the current through the cut-off device 10 and/or of the phase-to-ground voltage, or in the installation, in particular to verify that the fault has been eliminated. However, the fault may not have been eliminated. Thus, based on the parameters detected for the current through the device and/or the phase-to-ground voltage, an immediate reopening of the device can be caused without waiting for the re-closure of the secondary switch 24, which would constitute a complete re-closure of the device 10.

It has been seen above that, in order to ensure the effective electrical cut-off in the primary switch, different oscillation circuits 40 could be used. The one illustrated in FIG. 5 is relatively simple to implement. However, this circuit must then be configured so that it can interrupt all fault currents able to arise, including in particular those having the maximum intensity that can be anticipated. However, in use, there are sometimes fault currents that do not reach this maximum value. In this case, an oscillation circuit such as the one illustrated in FIG. 5 may turn out to be overdimensioned, in the sense that the counter-current it generates will be very large compared to the fault current. It follows that in this case, the oscillation circuit 40 will indeed generate one or more zero crossings of the current through the main switch 18, but such a zero crossing can then occur with too high a rate of variation of the intensity d(I18)/dt through the primary switch 18. In the presence of a too high rate of variation of the intensity d(I18)/dt through the primary switch 18, it is possible that the electrical cut-off does not occur, despite the zero crossing.

To do so, it is proposed to implement an oscillation circuit 40 as illustrated in FIGS. 1 and 2, and as described above. Indeed, thanks to such a device, it is possible to insert, as desired, in a controllable manner, and possibly temporarily, the damping resistor 48 in the oscillation loop formed by the oscillation circuit 40 and the main line portion 16 which includes the primary switch 18. Thus, without changing the oscillation capacitance 44, nor its initial charging level, and without changing the inductance 42, it becomes possible, at a lower cost, to modify the oscillation current which is injected into the oscillation loop by the oscillation circuit 40. The presence of the bypass switch 50 allows, instantaneously, transforming the oscillation circuit 40 from a series RLC circuit into a series LC circuit, or vice versa. In other embodiments, the presence of the bypass switch 50 associated with a damping resistor 48 allows, instantaneously, transforming the oscillation circuit 40 of a series RLC circuit into another RLC circuit in series with a different total electrical resistance value.

Thus, based on the fault current flowing in the main line 16, it is possible, with a view to ensuring the effective electrical cut-off in the primary switch 18, to inject into the oscillation loop, an oscillation current resulting either from the discharge of a series RLC circuit or from the discharge of a series LC circuit, or from the discharge of another series RLC circuit with a different total electrical resistance value.

In this way, it is possible to provide for a method for controlling a cut-off device 10 including an oscillation circuit 40 as illustrated in FIGS. 1 and 2, including, at a given instant, determining at least one parameter of a current to be cut off through the device, for example determining a value of intensity of this current. This determination can be direct, for example by the presence of a current intensity sensor in the main line portion 16 which includes the primary switch 18. This determination can be indirect, for example by analysis of other parameters of the cut-off device or of the installation. This determination can combine both a direct determination and an indirect determination. This determination can be made before the beginning of the process of opening the cut-off device, in particular before any mechanical opening of the primary switch 18. This determination can be made after the beginning of the process of opening the cut-off device, in particular after the mechanical opening of the primary switch 18. Of course, it is also possible to take into account, for this determination, parameters determined before and after the start of the process of opening the cut-off device 10.

On the basis of this determination, for example based on the determined value of fault current intensity, the control method can determine the state into which the bypass switch 50 must be switched.

The example illustrated in FIG. 3, relating more particularly to the operation of a device as illustrated in FIG. 1, illustrates the case where the oscillation circuit 40 is activated by the closure of the oscillation trigger 46 at an instant t1. At this instant, and in the instants which immediately follow, it is noted that the current I50 through the bypass switch 50 remains at zero, which testifies to the open state of the bypass switch 50, up to an instant t2. Thus, between the instants t1 and t2, the damping resistor 48 is effectively inserted into the oscillation circuit 40, which is then a series RLC circuit. Thus, the start of the discharge of the oscillation capacitance 44 corresponds to the discharge of a series RLC circuit. From the instant t2, the bypass switch 50 is switched to its closed state, so as to short-circuit the damping resistor 48. Thus, the rest of the discharge of the oscillation capacitance 44 corresponds to the discharge of a series LC circuit.

Of course, it is possible to determine the duration of the time interval d1t between the instants t1 and t2, time interval during which the damping resistor 48 is actually inserted into the oscillation circuit 40. This duration can be predetermined, or it can be determined based on some parameters of the electrical current in the device, in particular based on parameters of the fault current through the primary switch 18.

Thus, the cut-off device 10 including an oscillation circuit 40 as illustrated in FIGS. 1 and 2, can be controlled so that, at closure of the trigger switch 46, the damping resistor 48 is inserted into the oscillation circuit 40, or on the contrary short-circuited relative to this circuit. When the damping resistor 48 is inserted into the oscillation circuit 40, it allows in particular limiting the rate of variation of the intensity d(I18)/dt of the current generated by the oscillation circuit 40 in the primary switch 18 at the beginning of the discharge of the oscillation capacitance 44. In cases where the damping resistor 48 is actually inserted into the oscillation circuit at closure of the trigger switch 46, it can be chosen to be short-circuited after a certain time interval, as illustrated in FIG. 3, including before the electrical cut-off is effective in the primary switch 18, or on the contrary chosen to be kept inserted into the oscillation circuit for the whole duration of activation of the oscillation circuit 40.

For a device as illustrated in FIG. 1, an optimal relationship was determined between the parameters characteristic of the oscillation circuit $$d1t = \ln\left(\frac{V44i_0^2 * C44}{Idef_0^2 * L42 + \left(\frac{dI18}{dt}\right)\max_0^2 * L42^2 * C44}\right) * \frac{L42}{R48} \quad [\text{Math. 1}]$$

with
- d1t: Interval of time during which the damping resistor 48 is actually inserted into the oscillation circuit 40;
- (dI18/dt) max: maximum value of dI18/dt at the zero crossing of the current in the primary switch 18 for which the primary switch 18 can, on its own, ensure an electrical cut-off;
- V44i: Initial voltage across the capacitance 44 of the oscillation circuit;
- Idef: Amplitude of the current to be cut off through device 10;
- R48: electrical resistance value of the damping resistor 48;
- C44: capacitance value of capacitance 44 of the oscillation circuit 40;
- L72: Inductance value of the inductance 42 of the oscillation circuit 40.

In any case, it is observed that the electrical resistance value of the damping resistor 48 does not need to be large. Therefore, the component(s) forming the damping resistor(s) can be compact and inexpensive. In addition, thanks to this low resistance value, the voltage value imposed on the bypass switch 50 associated with the resistor is also relatively low. Therefore, the component(s) forming the bypass switch(es) 50 can be compact and inexpensive.

The invention claimed is:

1. A current cut-off device for high-voltage DC electrical current, comprising:
   - a main line between a primary point and a secondary point;
   - a mechanical primary switch and a mechanical secondary switch interposed successively in the main line between the primary point and the secondary point but on either side of an intermediate point of the main line, the two mechanical switches being each controlled between an open state and a closed state,
   - a primary surge protector arranged in parallel with the primary switch between the primary point and the intermediate point,
   - a secondary surge protector arranged electrically in parallel with the secondary switch,
   - wherein the secondary surge protector is arranged electrically between the intermediate point and the secondary point, and in that the device includes, between the primary point and the secondary point, a capacitive buffer circuit, electrically in parallel with an assembly formed by the primary switch and the secondary switch, and electrically in parallel with an assembly formed by the primary surge protector and the secondary surge protector, the capacitive buffer circuit including an activation switch and a buffer capacitance.

2. The cut-off device according to claim 1, wherein the capacitive buffer circuit does not include a dedicated inductive component.

3. The cut-off device according to claim 1, wherein the activation switch and the buffer capacitance are arranged electrically in series in a line of the capacitive buffer circuit going from the primary point to the secondary point.

4. The cut-off device according to claim 1, wherein the capacitive buffer circuit includes a circuit for discharging the buffer capacitance.

5. The cut-off device according to claim 1, wherein the capacitive buffer circuit includes a tertiary surge protector arranged in parallel with the activation switch.

6. The cut-off device according to claim 5, wherein the tertiary surge protector is arranged directly across the activation switch.

7. The cut-off device according to claim 1, wherein the cut-off device includes an oscillation circuit arranged electrically in parallel with the primary switch between the primary point and the intermediate point, the oscillation circuit being able to generate a zero crossing of the current through the primary switch.

8. The cut-off device according to claim 7, wherein the oscillation circuit includes at least an inductor, a capacitance and an oscillation trigger electrically in series with each other.

9. The cut-off device according to claim 8, wherein the cut-off device includes, in the oscillation circuit, at least one damping resistor electrically in series with the inductor, the capacitance and the oscillation trigger of the oscillation circuit, and a controllable device for varying the resistance value inserted in series into the oscillation circuit.

10. The cut-off device according to claim 8, wherein the cut-off device includes at least one bypass switch of a damping resistor, in that the bypass switch is able to switch between an open state and a closed state, the damping resistor and the bypass switch being arranged such that, in a state of the bypass switch, the damping resistor is inserted electrically in series into the oscillation circuit with the inductor, the capacitance and the oscillation trigger of the oscillation circuit while, in the other state of the bypass switch, the damping resistor is short-circuited relative to the oscillation circuit.

11. The cut-off device according to claim 9, wherein the oscillation circuit includes at least one permanent resistor, permanently inserted into the oscillation circuit, electrically in series with the inductor, the capacitance and the oscillation trigger of the oscillation circuit.

12. The cut-off device according to claim 9, wherein the oscillation circuit includes several damping resistors each associated with a distinct bypass switch of the damping resistor, in that each bypass switch is able to switch between an open state and a closed state, a damping resistor and the associated bypass switch being arranged such that, in a state of the bypass switch, the damping resistor associated with the switch is inserted electrically in series into the oscillation circuit with the inductor, the capacitance and the oscillation trigger of the oscillation circuit while, in the other state of the bypass switch, the damping resistor associated with the switch is short-circuited relative to the oscillation circuit.

13. The cut-off device according to claim 1, wherein the primary switch includes at least one vacuum switch.

14. The cut-off device according to claim 1, wherein the secondary switch includes at least one insulating gas switch.

15. The cut-off device according to claim 1, wherein the secondary switch includes at least one vacuum switch.

16. The cut-off device according to claim 4, wherein the circuit for discharging the buffer capacitance includes a resistor which is arranged in parallel with the buffer capacitance.

17. The cut-off device according to claim 4, wherein the circuit for discharging the buffer capacitance is a passive discharge circuit, not including active component.

18. A method for controlling a cut-off device according to claim 1, wherein method includes the steps of:
   mechanically opening the primary switch and the secondary switch;
   cutting off the current in the open primary switch to cause the occurrence, across the primary switch, of a voltage greater than the transition voltage of the primary surge protector suitable for switching into a current conduction mode;
   switching the activation switch to allow, in the capacitive buffer circuit, the passage of a current suitable for charging the buffer capacitance and diverting the current in the secondary switch.

19. The method for controlling according to claim 18, wherein the method includes the steps of:
   mechanically closing the main switch;
   mechanically closing the secondary switch if there has not been any immediate reopening of the device.

20. The method for controlling a cut-off device according to claim 18,
   wherein the cut-off device includes an oscillation circuit arranged electrically in parallel with the primary switch between the primary point and the intermediate point, the oscillation circuit being able to generate a zero crossing of the current through the primary switch;
   wherein the oscillation circuit includes at least an inductor, a capacitance and an oscillation trigger electrically in series with each other;
   wherein the cut-off device includes at least one bypass switch of a damping resistor, in that the bypass switch is able to switch between an open state and a closed state, the damping resistor and the bypass switch being arranged such that, in a state of the bypass switch, the damping resistor is inserted electrically in series into the oscillation circuit with the inductor, the capacitance and the oscillation trigger of the oscillation circuit while, in the other state of the bypass switch, the damping resistor is short-circuited relative to the oscillation circuit;
   wherein the method includes determining a value of intensity of a current to be cut off through the device and determining, based on the determined value of fault current intensity, the state into which the at least one bypass switch must be switched.

21. The method for controlling a cut-off device according to claim 18,
   wherein the cut-off device includes an oscillation circuit arranged electrically in parallel with the primary switch between the primary point and the intermediate point, the oscillation circuit being able to generate a zero crossing of the current through the primary switch;
   wherein the oscillation circuit includes at least an inductor, a capacitance and an oscillation trigger electrically in series with each other,
   wherein the cut-off device includes, in the oscillation circuit, at least one damping resistor electrically in series with the inductor, the capacitance and the oscillation trigger of the oscillation circuit, and a controllable device for varying the resistance value inserted in series into the oscillation circuit;
   wherein the oscillation circuit includes several damping resistors each associated with a distinct bypass switch of the damping resistor, in that each bypass switch is able to switch between an open state and a closed state, a damping resistor and the associated bypass switch being arranged such that, in a state of the bypass switch, the damping resistor associated with the switch is inserted electrically in series into the oscillation circuit with the inductor, the capacitance and the oscillation trigger of the oscillation circuit while, in the other state of the bypass switch, the damping resistor associated with the switch is short-circuited relative to the oscillation circuit;

wherein some at least of the bypass switches of the oscillation circuit are switched with a time shift relative to each other.

22. The method for controlling a cut-off device according to claim 18, wherein, in the initial state, the buffer capacitance is discharged.

* * * * *